US011509977B2

(12) United States Patent
Petkov et al.

(10) Patent No.: US 11,509,977 B2
(45) Date of Patent: Nov. 22, 2022

(54) METHOD FOR OPERATING A SUPPLY SYSTEM

(71) Applicant: DIEHL METERING SYSTEMS GMBH, Nuremberg (DE)

(72) Inventors: Hristo Petkov, Nuremberg (DE); Michael Traenkler, Buechenbach (DE); Thomas Kauppert, Nuremberg (DE); Benjamin Meyer, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 121 days.

(21) Appl. No.: 16/665,048

(22) Filed: Oct. 28, 2019

(65) Prior Publication Data

US 2020/0059709 A1 Feb. 20, 2020

Related U.S. Application Data

(63) Continuation of application No. PCT/EP2018/000242, filed on May 7, 2018.

(30) Foreign Application Priority Data

May 20, 2017 (DE) .......................... 102017004888.6

(51) Int. Cl.
*H04Q 9/02* (2006.01)
*G01D 4/00* (2006.01)

(52) U.S. Cl.
CPC ............... *H04Q 9/02* (2013.01); *G01D 4/002* (2013.01); *H04Q 2209/40* (2013.01); *H04Q 2209/60* (2013.01); *H04Q 2209/826* (2013.01)

(58) Field of Classification Search
CPC .. H04Q 9/02; H04Q 2209/40; H04Q 2209/60; H04Q 2209/826; G01D 4/002
See application file for complete search history.

(56) References Cited

U.S. PATENT DOCUMENTS

| 2008/0122651 A1 | 5/2008 | Niederfeld et al. |
| 2011/0140909 A1* | 6/2011 | Olson ...................... H04Q 9/00 340/870.02 |

(Continued)

FOREIGN PATENT DOCUMENTS

| CN | 102860036 A | 1/2013 |
| DE | 10133367 A1 | 1/2003 |

(Continued)

OTHER PUBLICATIONS

Tang Xinhua: "Foundation of Digital Control for Material Processing", Shanghai Jiao Tong University Press, 2015, ISBN 978-7-313-13727-2—Statement of Relevance.

*Primary Examiner* — Amine Benlagsir
(74) *Attorney, Agent, or Firm* — Laurence A. Greenberg; Werner H. Stemer; Ralph E. Locher (57) ABSTRACT

A method operates a supply system having a measuring unit and a central unit. Information is transferred repeatedly at specific time intervals via a communication network by radio between the central unit and the measuring unit. The measuring unit or the central unit receives the information and then generates a receipt confirmation, which it transmits to the central unit or the measuring unit respectively. The central unit or the measuring unit, after transmitting the information, opens a receive window of a certain time length for receiving the receipt confirmation. As a result of a first trigger event, the time intervals between the repeat transmissions of the information are shortened, and/or an additional receive window for receiving the receipt confirmation is opened, and as a result of a second trigger event, the time intervals between the repeat transmissions are lengthened, and/or no additional receive windows are opened.

24 Claims, 6 Drawing Sheets

(56) References Cited

U.S. PATENT DOCUMENTS

| | | | | |
|---|---|---|---|---|
| 2012/0163213 | A1* | 6/2012 | Sanderford, Jr. | H04Q 9/00 |
| | | | | 370/252 |
| 2013/0054174 | A1 | 2/2013 | Blank et al. | |
| 2016/0080837 | A1* | 3/2016 | Cornwall | G01S 11/06 |
| | | | | 340/870.02 |
| 2016/0174263 | A1* | 6/2016 | Webb | H04W 74/0833 |
| | | | | 370/329 |
| 2017/0041881 | A1* | 2/2017 | Won | H04W 52/223 |
| 2017/0078913 | A1* | 3/2017 | Chang | H04L 47/193 |
| 2017/0288817 | A1* | 10/2017 | Cao | H04L 1/1819 |
| 2018/0034694 | A1* | 2/2018 | Farnham | H04L 41/147 |
| 2018/0041957 | A1* | 2/2018 | Xiong | H04W 76/28 |
| 2018/0195926 | A1* | 7/2018 | Barker | E03B 7/075 |

FOREIGN PATENT DOCUMENTS

| | | |
|---|---|---|
| DE | 102007062077 A1 | 2/2009 |
| DE | 102010019376 A1 | 11/2011 |
| EP | 1244083 A1 | 9/2002 |
| EP | 1630980 B2 | 3/2006 |
| EP | 1924119 A1 | 5/2008 |
| EP | 2150084 A2 | 2/2010 |
| FR | 2997759 A1 | 5/2014 |

* cited by examiner

(Prior art)

METHOD FOR OPERATING A SUPPLY SYSTEM

CROSS-REFERENCE TO RELATED APPLICATION

This is a continuation application, under 35 U.S.C. § 120, of copending international application No. PCT/EP 2018/000242, filed May 7, 2018, which designated the United States; this application also claims the priority, under 35 U.S.C. § 119, of German patent application No. DE 10 2017 004 888.6, filed May 20, 2017; the prior applications are herewith incorporated by reference in their entirety.

BACKGROUND OF THE INVENTION

Field of the Invention

The present invention relates to a method for operating a supply system, in particular a consumption meter system, according to the preamble of the first independent claim, and to a method for operating a supply system according to the second independent claim.

The transfer of data or information from measuring units such as, for instance, sensors, consumption measuring devices or components of smart home controllers, is becoming increasingly important. Everyday devices in particular, for instance devices such as gates, lamps, coffee machines, blinds, can thereby be controlled intelligently, i.e. automatically and efficiently, providing inconspicuous assistance to the user. Another possibility, for example, is to arrange scheduled maintenance automatically and to order relevant consumables automatically, for instance automatic ordering of printer cartridges. To do this, these "smart measuring units" have communication modules, which communicate, for instance via radio, with other measuring units, devices, control centers, the Internet or an Internet-like structure such as the Internet of Things (IoT for short).

An important area of use for smart measuring units is the deployment of smart consumption measuring devices, also known as smart meters. Such consumption measuring devices are typically devices that are integrated in a supply network and assigned each to a residential, industrial or commercial unit, and that measure the consumption of heat, electricity, gas or water, for example. The smart consumption measuring devices indicate to the associated utility customer the actual consumption, and convey this to a higher-level central unit, for instance the control station of the supplier, a data collector, a concentrator, or the like. Thus the advantage of the smart consumption measuring devices is that it is possible to dispense with manual meter readings, and the supplier can invoice more quickly on the basis of actual consumption. Shorter intervals between readings in turn mean that the retail tariffs are linked more accurately to trends in market electricity prices. In addition, far better utilization of the supply networks is possible.

The measurement data generated is generally transferred in the form of data packets or messages via radio, for example in the ISM (Industrial, Scientific, Medical) frequency band or SRD (Short Range Device) frequency band, to higher-level data collectors, for instance concentrators. These frequency bands have the problem that interference is common owing to the prevalence of use of such frequency bands for a huge range of technical equipment, for instance garage-door controllers, baby monitors, alarm installations, WLAN, Bluetooth, smoke alarms, or the like.

The smart consumption measuring devices are increasingly being radio-controlled remotely via communication networks, for instance by the control station of the supplier. For example, it is possible to cut off the supply of electricity or water by these means without service personnel needing to be on-site. For instance, disconnection devices known as "breakers" are employed for this purpose, which can be used to suspend the supply of the supply medium.

Furthermore, energy efficiency is highly relevant to the consumption measuring devices of the type in question, because today's consumption measuring devices are usually battery-operated and are meant to have maintenance intervals that are as long as possible. Frequent data transmissions and increased ready-to-receive times, known as receive windows, dramatically reduce the battery life but improve the transfer reliability, something which must be guaranteed especially in emergencies, for instance in the event of a power cut, line damage or a burst pipe. Usually a compromise is made here by selecting a transmit and ready-to-receive time that is just sufficient yet is still considered acceptable from an energy viewpoint. There is consequently great interest in improving the transfer reliability especially in emergencies without increasing the energy consumption.

Published, non-prosecuted German patent application DE 10 2010 019 376 A1 describes a method for supplying an electricity consumer connected to an electricity meter. In this document, the electricity meter includes a communication interface, via which it can convey the meter data to a central computational unit of an energy supplier and can communicate with other electricity meters. The communication between electricity meter and central unit takes place in this case by wired or wireless means, e.g. via DSL or Powerline. The electricity meter is powered by electricity supplied via a cable. The central unit conveys to the electricity meter, data for enabling or suspending the delivery of electricity. The electricity meter is connected to a disconnection device for this purpose, which can be used to suspend or enable the delivery of electricity. The communication between electricity meter and central unit can take place continuously here to provide good transfer reliability, although this results in high energy consumption. The electricity meter in this document has the disadvantage that it must be supplied with electricity via a cable. This creates disadvantages for the installation. In addition, power cuts mean that the consumption can no longer be recorded and also data cannot be conveyed to the central unit.

SUMMARY OF THE INVENTION

The object of the present invention is to provide a method for operating a consumption meter system, in which the transfer reliability is improved without changing the energy efficiency.

The aforementioned object is achieved by the entire teaching of first independent claim and by the method of the additional independent claim. The dependent claims contain advantageous embodiments of the invention.

According to the invention, as a result of a first trigger event occurring, for instance an event such as an emergency in the region of the supply network, the time intervals between the repeat transmissions of the information are shortened and/or the central unit opens at least one additional receive window, which is used for receiving the receipt confirmation from the measuring unit. This can increase the rate of transmission and the ready-to-receive time of the communication modules. For example, an emergency transmit program can be provided thereby, which, on the emergency or the (first) trigger event occurring, improves the transfer reliability by increasing the rate of transmission (i.e. the repeat transmissions), for instance until the maximum possible duty cycle is reached for the particular frequency. In addition, as a result of a second trigger event occurring, the time intervals between the data transmissions are lengthened again and/or no more additional receive windows are opened, i.e. the rate of transmission and/or the ready-to-receive time is reduced again or normalized after the occurrence of the second trigger event, which signals, for instance, that the emergency has been resolved. The advantage thereof is that the increase in the rate of transmission and/or ready-to-receive time is maintained only until the event causing the increase is fixed. Thus the transfer reliability is increased temporarily for the duration of the emergency, and once the transfer is successful, is decreased again in order to save energy.

In another independent claim, the present invention claims a method in which the transmit power for transmitting the information is reduced as a result of the first trigger event occurring, and is increased again as a result of the second trigger event occurring. It is thereby advantageously possible, for instance, to increase the transmission period while simultaneously reducing the transmit power. Number of transmissions per unit of time can hence be increased, while the electricity consumption can be reduced at the expense of the transmit power. This allows the electricity consumption to be kept constant or even reduced even after the first trigger event has occurred (i.e. even during an increased rate of transmission).

The second trigger event can advantageously be defined as the central unit receiving the receipt confirmation from a measuring unit, and/or as the tripping of a timer, and/or as the successful connection to an external transmission system (e.g. radio system, network, or the like). It must be assumed in this case that the (first) event causing the change, i.e. increase or decrease, in the rate of transmission and/or ready-to-receive time and/or transmit power has been resolved by the successful information transfer and the introduction of suitable measures such as, for instance, switching on the electricity supply by switching off the breaker function.

Alternatively or additionally, a timer or a countdown function can be provided, wherein the timer is started when the first trigger event occurs, and, for instance, is stopped or runs outs after a definable time length. The timer run-out or countdown run-out can advantageously constitute the second trigger event, so that, by the second trigger event occurring automatically on the expiry of the definable time length after the first trigger event, the time intervals between the repeat transmissions are shortened and/or additional receive windows are opened for the time length definable by the timer.

In addition, the measuring units and/or the central unit can be configured such that they can transmit and receive over a plurality of radio systems and/or a plurality of frequency channels. For example, the measuring unit can use a robust technology for the transmission to the central unit (uplink), and can use the technology that has the best transfer sensitivity for the transmission of the receipt confirmation by the central unit (downlink). Alternatively or additionally, the transmitting units can transmit the information also in the form of shorter data packets over different frequency channels for each packet.

If a plurality of radio systems is used for the information transfer, the transfer can preferably be performed, for instance, via the radio system that has the greatest range and/or strongest error correction capability, i.e. the most robust radio system. In this case, statistics can be produced from the data from the measuring unit and the central unit, for instance statistics on the respective signal-to-noise ratios (SNR), signal-to-interference ratios (SIR), the transfer reliability or interference susceptibility of the radio system or the like, which are used to assess the radio system concerned. Hence preferably the radio system can be used that is assessed to be most suitable for the given transfer situation.

The transmit power for transmitting the information is preferably increased as a result of the first trigger event occurring, and decreased again as a result of the second trigger event occurring. For example here, a maximum possible transmit power can be activated briefly, for instance an increase in the transmit power from 10 dBm to 14 dBm, in order to reduce the impact of interference sources or interference effects by increasing the signal strength.

The time length of the receive window(s) can advantageously be increased as a result of the first trigger event occurring, and decreased again as a result of the second trigger event occurring. Time differences between the transmitting unit and the receiving unit, or rather their respective timing instruments, can be mitigated by increasing the time length of the receive windows.

Advantageously, the shortening of the time intervals between the repeat transmissions, and/or the opening of additional receive windows, and/or the change, in particular the increase or decrease, in the transmit power and/or in the time length of the receive window, takes place only for the duration of a certain transmit time period, in which repeat transmission is higher, between the first and second trigger events. It is hence possible to save even more energy.

In addition, a plurality of transmit time periods in which repeat transmission is higher can be provided between the first trigger event occurring and the second trigger event occurring, and transmit pauses and/or transmit time periods in which repeat transmission is not higher can be provided between the transmit time periods in which repeat transmission is higher. It is hence possible to implement transmit schemes that can facilitate, for example, increasing rates of transmission or transmissions in intervals. This improves the transfer reliability even further.

The central unit and/or the measuring units can advantageously select the frequency channel for the information transfer. The frequency channels that have the best possible information transfer can be selected in this case for the information transfer. This improves the transfer reliability yet further.

The measuring units and/or the central unit preferably perform a frequency channel assessment on the basis of the signal-to-noise ratio (SNR) and/or on the basis of the signal-to-interference ratio (SIR), for instance by the units detecting the signal strength during the information transfer, and relating this to the signal strength outside the information transfer. This frequency channel assessment can then advantageously be used for selecting the frequency channel.

In addition, a lookup table can be provided, in which expected values for specific parameters can be stored, which can be derived from information that has already been conveyed. The lookup table is used here for checking the parameter data. For example, a certain divergence of the conveyed information or of the parameter data from the expected values in the lookup table can constitute a first trigger event.

The time interval between the first trigger event and the start of the transfer of the information can advantageously be set. Alternatively or additionally, the shortened time intervals can be set on the basis of a defined pattern or pseudo-randomly. For example, the shortened time intervals can be set by a PRB (pseudo-random binary) sequence or by a transmit pattern having e.g. defined transmit times. It is convenient to lengthen the time intervals between repeat transmissions again after the second trigger event has occurred, i.e. these time intervals, once the second event has occurred, are also no longer set on the basis of a defined pattern or pseudo-randomly.

According to a preferred embodiment of the present invention, a multiplicity of measuring units or consumption measuring devices and/or central units or data collectors or concentrators are provided within the communication network.

When reading the claim language, the following definitions apply. When the claim language recites A and/or B it means A alone, B alone or A and B. When the claim language recites at least one of A and B it means A alone, B alone or A and B. When the claim language recites at least one of A or B it means A alone, B alone or A and B.

Other features which are considered as characteristic for the invention are set forth in the appended claims.

Although the invention is illustrated and described herein as embodied in a method for operating a supply system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
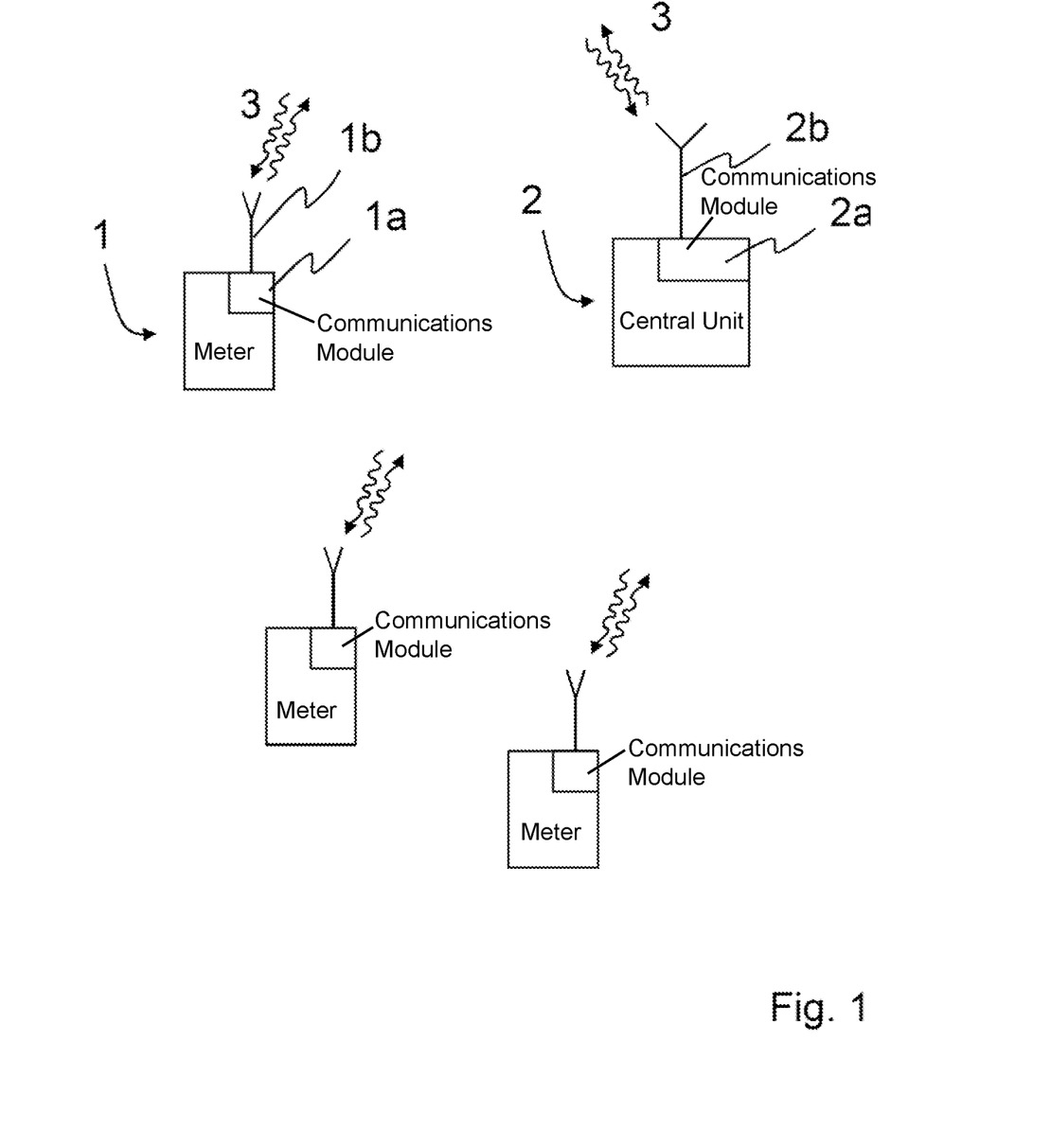
FIG. 1 is a simplified schematic diagram of a communication system containing a plurality of consumption measuring devices and a central unit.
Figure 2:
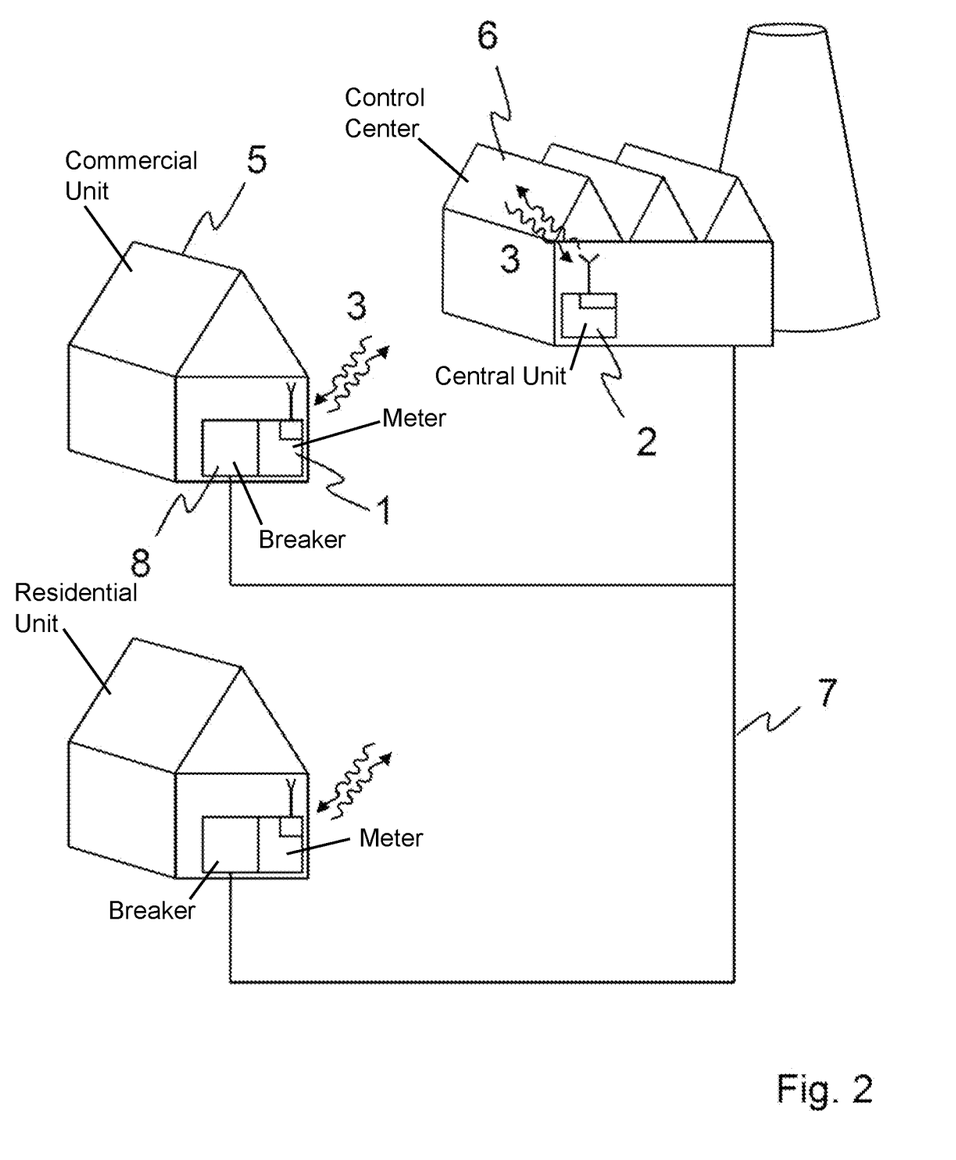
FIG. 2 is a simplified schematic diagram of residential units having consumption measuring devices, and a control center of a supplier, which transfer information within a communication system.

Referring now to the figures of the drawings in detail and first, particularly to FIG. 1 thereof, there is shown an embodiment of a radio-operated communication system between a plurality of measuring units and a central unit 2. The measuring units are consumption meters or consumption measuring devices 1, which are intended to ascertain the latest consumption of electricity, water or heat. For example, as shown in FIG. 2, the consumption measuring devices 1 may be assigned to, or located in, individual commercial, industrial or residential units 5. The consumption measuring devices 1 convey the ascertained consumption data to the higher-level central unit 2, for instance a data collector within a control center 6 of the supplier. The control center 6 supplies the residential units 5 via a supply line 7 with the supply medium, e.g. water, electricity, gas, or suchlike.

The consumption measuring devices 1 each contain a communication module 1*a* having an antenna 1*b* for transmitting and receiving information 3, for instance information such as consumption data or program data. In addition, the central unit 2 can transmit information 3, for instance information such as control instructions to switch off, switch on, control and regulate the consumption measuring devices 1, for example as a short signal or beacon or in the form of data packets or messages containing a plurality of data packets, via the communication system to the consumption measuring devices 1. The information is transferred in the communication system typically by radio, in particular by the SRD or ISM bands. For this purpose, the central unit 2 likewise contains a communication module 2*a* and an antenna 2*b* for transmitting and receiving the information 3. For the purpose of switching on and off the supply to the individual residential units 5, each consumption measuring device 1 is assigned a breaker 8, which is configured to facilitate remotely-controlled customer separation, i.e. to disconnect the associated residential unit 5 from the supply and/or connect same.

For example, the breaker 8 can be used to disconnect the relevant residential unit 5 from the supply of the supply medium (e.g. electricity, water, heat, or suchlike) if a trigger event occurs (e.g. first trigger event EA1). In the case that a first trigger event EA1 has occurred, then usually the supply is meant to be switched on or off as quickly as possible. This requires a high transfer reliability, which guarantees that the information about a switch-on or switch-off to be performed is transferred reliably. The first trigger event EA1 may be, for example, a shortfall in supply identified in the control center 6 of the supplier, during which shortage it is necessary to disconnect individual residential units 5 temporarily from the supply as part of load management. In addition, for instance, a change in contract with the consumer or poor payment practice on the part of the consumer might make the supplier wish to disconnect the supply. Moreover, a leak in the supply system or in the region of the supply line 7 may also constitute a first trigger event EA1 that results in the supply being switched off for one or more residential units 5. The transfer reliability for the information transfer from the central unit 2 to the measuring unit, and from the measuring unit to the central unit 2, plays an important role here.

Figure 3:
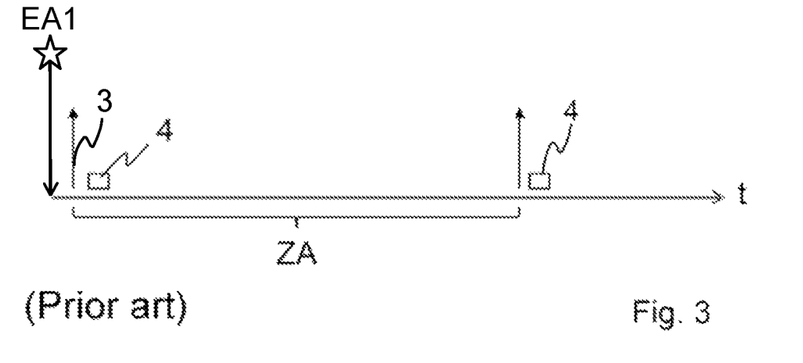
FIG. 3 is a simplified schematic diagram of successive information transmissions from a consumption measuring device according to the prior art.

FIG. 3 shows a sequence for transmitting information 3 between a measuring unit and a central unit 2 according to the prior art. In this case, the information 3 is conveyed repeatedly at specific time intervals ZA. For example, the central unit 2 attempts to convey to the consumption measuring device 1 the information 3, which contains the switching-off of the supply to a residential unit 5, or more precisely the switching of the breaker 8, in order to switch off via radio the supply to this residential unit 5 after a first trigger event EA1 has occurred. The central unit 2 subsequently opens a receive window 4 for receiving a receipt confirmation from the consumption measuring device 1, which the consumption measuring device 1 generates after receiving the information 3 and transmits to the central unit 2. This transmission procedure is repeated until the consumption measuring device 1 has received the information 3 and has confirmed this by means of the receipt confirmation.

Figure 4:
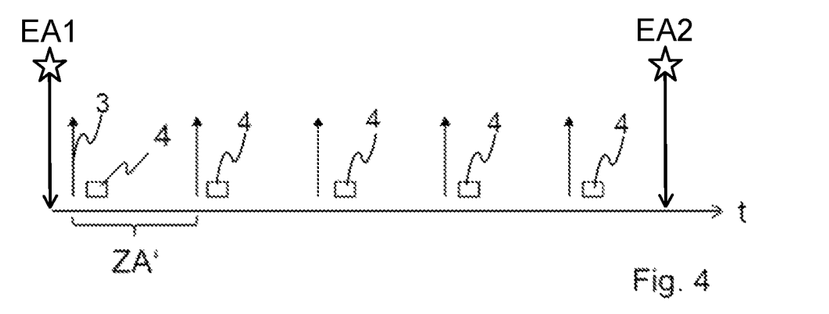
FIG. 4 s a simplified schematic diagram of successive information transmissions from a consumption measuring device according to the present invention.

Now the method according to the invention, as shown in FIG. 4, reduces the time intervals ZA as a result of a first trigger event EA1 occurring between the repeat transmissions of the information 3, so that a plurality of information transmissions per unit of time are performed in contrast with the normal transmit mode. The increased transmission of the information 3 briefly increases the energy consumption. In view of this, the time intervals ZA' between the repeat transmissions are lengthened again as a result of a second trigger event EA2 occurring, for instance receiving the receipt confirmation. The transmission times need not be rigidly predefined in this case, but can be varied flexibly, for instance by a generator. Likewise, the time intervals ZA' can also vary, for instance such that they get ever shorter from repeat transmission to repeat transmission until the information has been transferred successfully.

Figure 5:
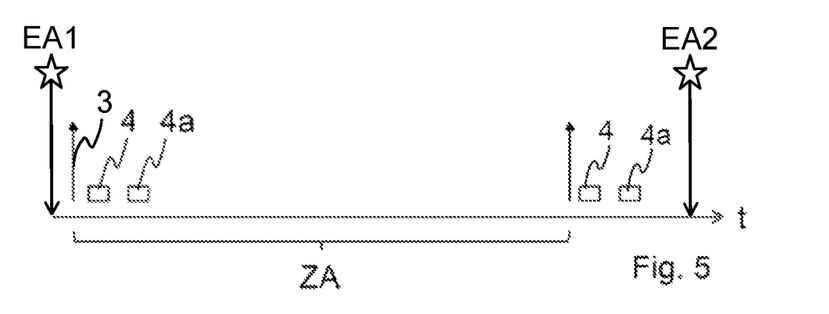
FIG. 5 is a second simplified schematic diagram of successive information transmissions from a consumption measuring device according to the present invention.

Alternatively or additionally, as shown in FIG. 5, the method according to the invention opens at least one additional receive window 4a for receiving the receipt confirmation as a result of a first trigger event EA1 occurring. This increases the probability of receiving the receipt confirmation. In addition, the opening of additional receive windows 4a is also stopped again when the second trigger event EA2 occurs.

Figure 6:
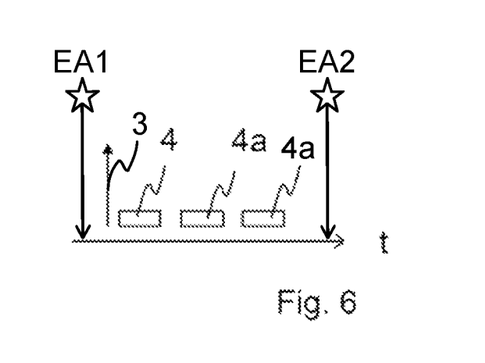
FIG. 6 is a simplified schematic diagram of an information transmission from a consumption measuring device having assigned receive windows according to the present invention.
Figure 7:
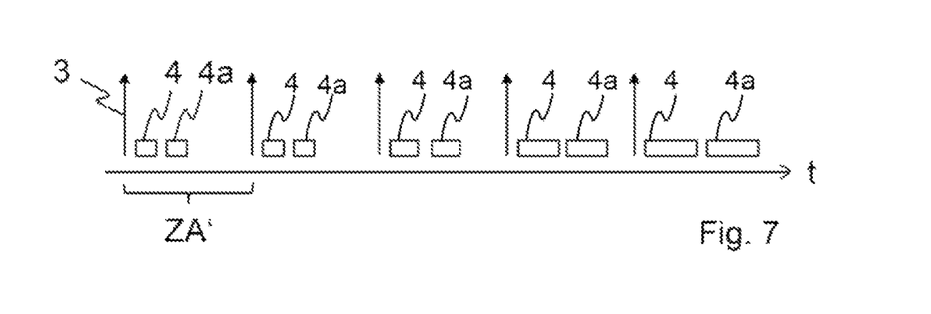
FIG. 7 is a third simplified schematic diagram of successive information transmissions from a consumption measuring device according to the present invention.

As shown in FIG. 6, it is also possible to provide a plurality of additional receive windows 4a. Moreover, the time length of the receive windows can be varied so that the receive windows 4a are longer, for instance, between the first trigger event EA1 occurring and the second trigger event EA2 occurring. Alternatively or additionally, the receive windows 4 and the additional receive windows 4a can also have a variable time length, for instance which increases, as shown in FIG. 7, from information transmission to information transmission, i.e. the receive windows get longer.

Figure 8:
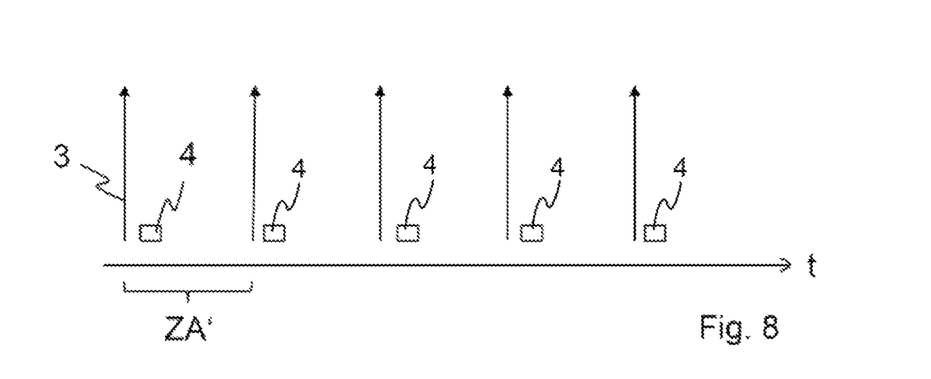
FIG. 8 is a fourth simplified schematic diagram of successive information transmissions from a consumption measuring device according to the present invention.

As shown in FIG. 8, it is also advantageously possible to increase the transmit power of the information transmissions, for instance from 10 dBm to 14 dBm. This is done, for example, in order to be able to mask out interference sources transmitting on the same frequency channels, or to reduce the adverse effects on transmission caused by said sources. Logically, this likewise increases the background noise on the respective frequency channels. Furthermore, the electricity consumption increases during the information transmission. Nevertheless, this can result in the transfer reliability being boosted briefly by the increase in the signal strength.

Figure 9:
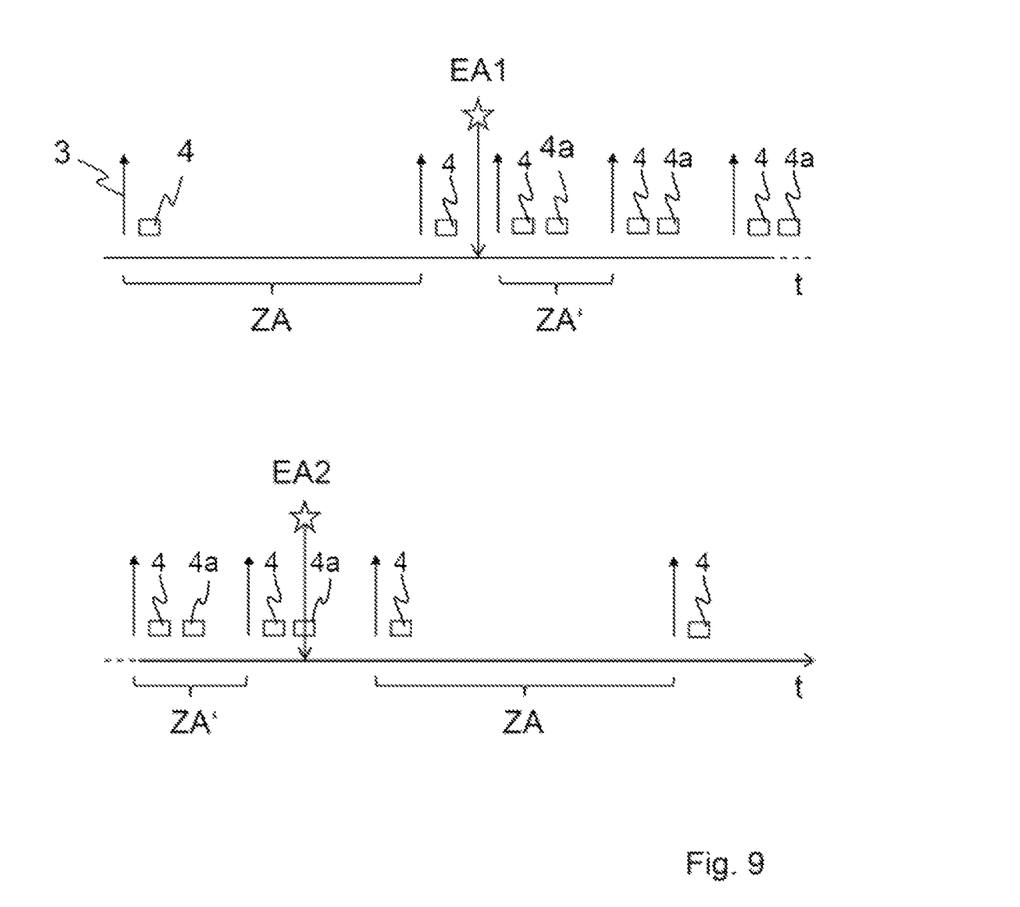
FIG. 9 is a simplified schematic diagram of the method flow according to the invention for successive information transmissions from a communication module.

FIG. 9 shows in a timing diagram an embodiment of a transmission sequence according to the invention for transmitting information 3 between a measuring unit and a central unit 2. In this case, the information 3 is first conveyed from the measuring unit to the central unit 2, for instance information such as a warning signal, and/or from the central unit 2 to the consumption measuring device 1, for instance information such as program update data, control data, or suchlike. After the information transmission, the transmitting unit opens a receive window 4, the purpose of which is to facilitate receiving a receipt confirmation from the receiving unit. These information transmissions are repeated at specific time intervals ZA apart.

For example, the measuring unit is a water meter, which detects a suddenly occurring high water consumption suggesting a burst pipe, for instance, and hence constituting a first trigger event EA1. An increased transfer reliability on the part of the meter is initially needed in this case. The water meter can convey the information 3, for instance a generated warning signal or the actual water consumption, to the central unit 2 of the supplier. In order to increase the transfer reliability, the time intervals ZA between the repeat transmissions are shortened to time intervals ZA' after the occurrence of the first trigger event EA1. In addition, the water meter opens additional receive windows 4a when the first trigger event EA1 occurs. After the central unit 2 receives the information 3, the central unit 2 generates a receipt confirmation and transmits this to the water meter. Receiving the receipt confirmation constitutes the second trigger event EA2, after which the time intervals ZA' between the repeat transmissions are lengthened again to time intervals ZA, and no more additional receive windows 4a are opened, in order to transmit in an energy-saving manner again.

In addition, the central unit 2 receiving the warning signal constitutes a first trigger event EA1 on the part of the central unit 2, in the event of which increased transfer reliability is needed by the central unit 2. In this case, after first trigger event EA1 has occurred, the central unit 2 transmits the information 3, which now contains the control data for switching off the water supply, to the water meter at shorter time intervals ZA' i.e. using increased repeat transmissions. In addition, the central unit 2 opens additional receive windows 4a in order to improve the readiness to receive the receipt confirmation from the water meter. When the second trigger event EA2 occurs, the receiving of the receipt confirmation in the receive window 4 or in the additional receive window 4a, the time intervals ZA' are lengthened again. In addition, no more additional receive windows 4a are opened.

A lookup table can also be provided advantageously, which is stored in a memory of the central unit 2 and/or in a memory of the measuring unit. The lookup table can store expected values for parameters, which can be derived, for instance, from information 3 conveyed earlier, for example information such as temperature, meter reading, consumption or suchlike. The expected values in the lookup table can be used to check the transferred information 3 or the parameters or parameter data, where a certain divergence of the conveyed information 3 or parameters from the expected values in the lookup table can constitute a first trigger event EA1. For example, comparing expected gas consumption and a detected far higher gas consumption can infer an irregularity, which may be explained by a leak, for instance.

Figure 10:
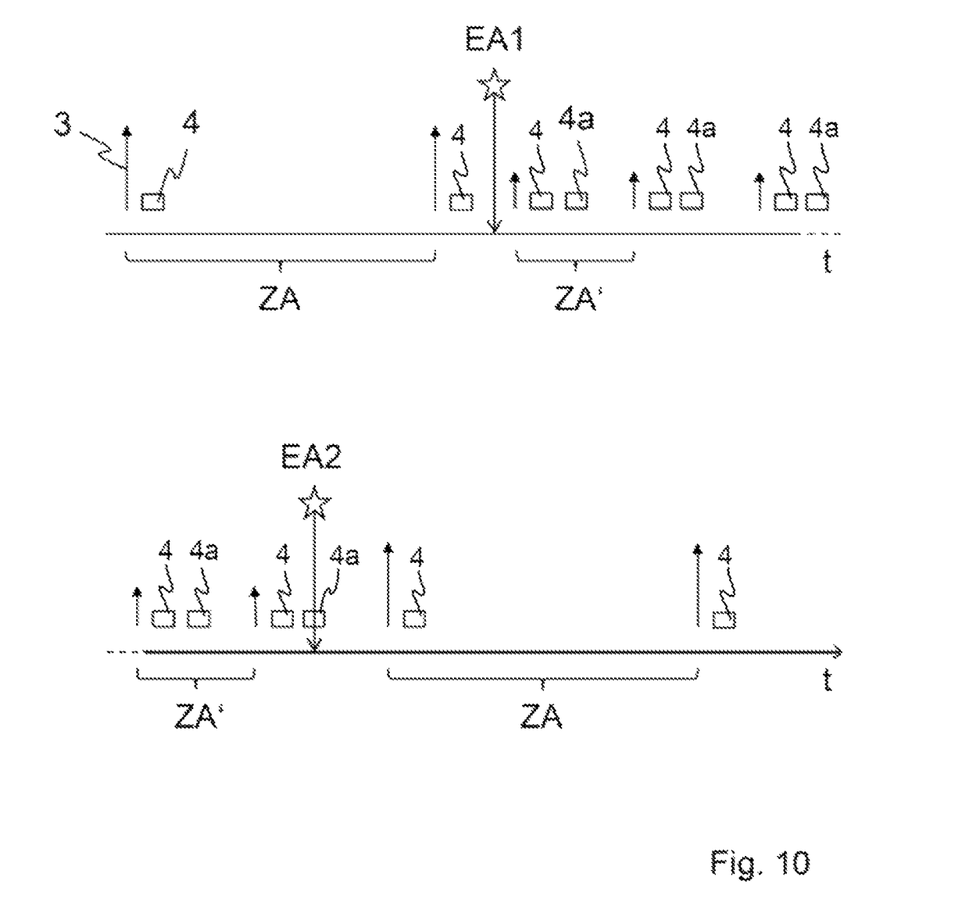
FIG. 10 is another simplified schematic diagram of the method flow according to the invention for successive information transmissions from a communication module.

FIG. 10 shows a particularly advantageous embodiment of the present invention. In this case, as a result of the first trigger event EA1 occurring, the time intervals ZA between the repeat transmissions of the information 3 are shortened, and an additional receive window 4a for receiving the receipt confirmation is opened. The transmit power is reduced at the same time, however, in particular to save energy. Then, as a result of the second trigger event EA2 occurring, the time intervals ZA' between the repeat transmissions are lengthened again, and no more additional receive windows 4a are opened. At the same time, the transmit power is raised again as a result of the second trigger event EA2 occurring. This can advantageously improve the transfer reliability and optimize the energy consumption. For example, a consumption meter 1 which is read by a fixed communication network or consumption meter system can hence move into a "drive-by mode" in the event of a network fault, for instance caused by natural disasters, power cuts or suchlike. The drive-by mode is active between the first trigger event EA1 occurring and the second trigger event EA2 occurring. The consumption meter 1 is read in this case via a mobile data collector in drive-by mode. The transmit period is increased in order to facilitate or help this process. This places a greater demand on the battery of the consumption meter 1, however. By reducing the transmit power of the consumption meter 1, however, less electricity is used and hence there is no additional load on the battery and/or the battery is conserved or its lifetime even extended.

In particular, a parameter divergence within the consumption meter system concerned (voltage drop or the like) can act as the first trigger event EA1. The receiving of the receipt confirmation and/or the triggering of a timer (e.g. a time switch that trips after a definable timespan) and/or the successful connection to another transmission system (e.g. radio system or network) can be provided as the second trigger event EA2.

The disclosure explicitly includes also individual feature combinations (sub-combinations) and possible combinations of individual features of different embodiments, which possible combinations are not presented in the drawing figures.

LIST OF REFERENCES 1 consumption meter
1a communication module
1b antenna
2 central unit
2a communication module
2b antenna
3 information
4 receive window
4a (additional) receive window
5 residential unit
6 control center
7 supply line
8 breaker
ZA time interval
ZA' (shortened) time interval
EA1 first trigger event
EA2 second trigger event

The invention claimed is:

1. A method for operating a supply system having a measuring unit and a central unit, which comprises steps of:
   transferring information about an operation of the supply system via a Short Range Device (SRD) or Industrial, Scientific, Medical (ISM) band communication network by radio between the central unit and the measuring unit;
   transmitting the information repeatedly at specific time intervals by the central unit and/or the measuring unit;
   receiving the information by the measuring unit or the central unit and then generating a receipt confirmation, and transmitting the receipt confirmation to the central unit or the measuring unit:
   opening in the central unit or the measuring unit a receive window of a certain time length for receiving the receipt confirmation after transmitting the information;
   increasing a transfer reliability by shortening the specific time intervals between repeat transmissions of the information as of a first trigger event occurring, and opening an additional receive window for receiving the receipt confirmation; and
   decreasing the transfer reliability by lengthening the specific time intervals between the repeat transmissions as of a second trigger event occurring, and no additional receive windows are opened, the second trigger event occurring being defined as the central unit receiving the receipt confirmation from the measuring unit, and/or as a tripping of a timer and/or as a successful connection to an external transmission system.

2. The method according to claim 1, which further comprises configuring at least one of the measuring unit or the central unit such that it can transmit and receive over a plurality of radio systems and/or a plurality of frequency channels.

3. The method according to claim 1, wherein the shortening of the specific time intervals between the repeat transmissions, and/or the opening of the additional receive window and/or a change in a transmit power and/or in the certain time length of the receive window, takes place only for a duration of a certain transmit time period, during an increase in a repeat transmission, between the first trigger event occurring and the second trigger event occurring.

4. The method according to claim 3, which further comprises generating a plurality of transmit time periods in which the repeat transmission is increased between the first trigger event occurring and the second trigger event occurring, and transmit pauses and/or the plurality of transmit time periods in which the repeat transmission is not increased are provided between the plurality of transmit time periods in which the repeat transmission is increased.

5. The method according to claim 3, wherein the change in the transmit power and/or in the certain time length of the receive window is an increase or a decrease.

6. The method according to claim 1, wherein the central unit and/or the measuring unit select a frequency channel for an information transfer.

7. The method according to claim 6, wherein the measuring unit and/or the central unit performs a frequency channel assessment and the frequency channel assessment is used for selecting the frequency channel.

8. The method according to claim 7, wherein the measuring unit and/or the central unit performs the frequency channel assessment on a signal-to-noise ratio and/or a signal-to-interference ratio.

9. The method according to claim 1, which further comprises providing a lookup table, in which are stored expected values for the information is conveyed and/or parameters, and the lookup table is used for checking the information and/or the parameters, wherein a certain divergence of the information is conveyed and/or of the parameters from the stored expected values in the lookup table constitutes the first trigger event occurring.

10. The method according to claim 1, which further comprises setting a time interval between the first trigger event occurring and a start of a transfer of the information and/or the shortening of the specific time intervals on a basis of a defined pattern or pseudo-randomly.

11. The method according to claim 1, which further comprises providing a plurality of measuring units and/or central units.

12. The method according to claim 1, wherein the supply system is a consumer meter system and the measuring unit is a consumption meter.

13. A method for operating a supply system having a measuring unit and a central unit, which comprises steps of:
   transferring information about an operation of the supply system via a Short Range Device (SRD) or Industrial, Scientific, Medical (ISM) band communication network by radio between the central unit and the measuring unit;
   transmitting the information repeatedly at specific time intervals by the central unit and/or the measuring unit;
   receiving the information by the measuring unit or the central unit and then generating a receipt confirmation, and transmitting the receipt confirmation to the central unit or the measuring unit:
   opening in the central unit or the measuring unit a receive window of a certain time length for receiving the receipt confirmation after transmitting the information;
   increasing a transfer reliability by shortening the specific time intervals between repeat transmissions of the information as of a first trigger event occurring, and/or opening an additional receive window for receiving the receipt confirmation;
   decreasing the transfer reliability by lengthening the specific time intervals between the repeat transmissions as of a second trigger event occurring, and/or no additional receive windows are opened; and
   increasing the transfer reliability by increasing a transmit power for transmitting the information as of the first trigger event occurring, and decreasing the transfer reliability by decreasing again the transmit power as of the second trigger event occurring, the second trigger event occurring being defined as the central unit receiving the receipt confirmation from the measuring unit, and/or as a tripping of a timer and/or as a successful connection to an external transmission system.

14. A method for operating a supply system having a measuring unit and a central unit, which comprises steps of:
   transferring information about an operation of the supply system via a Short Range Device (SRD) or Industrial, Scientific, Medical (ISM) band communication network by radio between the central unit and the measuring unit;
   transmitting the information repeatedly at specific time intervals by the central unit and/or the measuring unit;
   receiving the information by the measuring unit or the central unit and then generating a receipt confirmation, and transmitting the receipt confirmation to the central unit or the measuring unit;
   opening in the central unit or the measuring unit a receive window of a certain time length for receiving the receipt confirmation after transmitting the information;
   increasing a transfer reliability by shortening the specific time intervals between repeat transmissions of the information as of a first trigger event occurring, and/or opening an additional receive window for receiving the receipt confirmation;
   decreasing the transfer reliability by lengthening the specific time intervals between the repeat transmissions as of a second trigger event occurring, and/or no additional receive windows are opened; and
   increasing the transfer reliability by increasing the certain time length of the receive window as of the first trigger event occurring, and decreasing the transfer reliability by decreasing the certain time length again as of the second trigger event occurring, the second trigger event occurring being defined as the central unit receiving the receipt confirmation from the measuring unit, and/or as a tripping of a timer and/or as a successful connection to an external transmission system.

15. A method for operating a supply system having a measuring unit and a central unit, which comprises:
   transferring information about an operation of the supply system via a Short Range Device (SRD) or Industrial, Scientific, Medical (ISM) band communication network by radio between the central unit and the measuring unit;
   transmitting the information repeatedly at specific time intervals by the central unit and/or the measuring unit;
   receiving, via the measuring unit or the central unit, the information and then generating a receipt confirmation, which is transmitted to the central unit or the measuring unit;
   opening a receive window of a certain time length for receiving the receipt confirmation via the central unit or the measuring unit, after transmitting the information; and
   decreasing a transfer reliability by decreasing a transmit power for transmitting the information as of a first trigger event occurring, and increasing the transfer reliability by increasing the transmit power again as of a second trigger event occurring, the second trigger event occurring being defined as the central unit receiving the receipt confirmation from the measuring unit, and/or as a tripping of a timer and/or as a successful connection to an external transmission system.

16. The method according to claim 15, which further comprises configuring at least one of the measuring unit or the central unit such that they can transmit and receive over a plurality of radio systems and/or a plurality of frequency channels.

17. The method according to claim 15, wherein a shortening of the specific time intervals between repeat transmissions, and/or an opening of additional receive windows and/or a change in the transmit power and/or in the certain time length of the receive window, takes place only for a duration of a certain transmit time period, in which a repeat transmission is increased, between the first trigger event occurring and the second trigger event occurring.

18. The method according to claim 17, which further comprises generating a plurality of transmit time periods in which the repeat transmission is increased between the first trigger event occurring and the second trigger event occurring, and transmit pauses and/or the plurality of transmit time periods in which the repeat transmission is not increased are provided between the plurality of transmit time periods in which the repeat transmission is increased.

19. The method according to claim 15, wherein the central unit and/or the measuring unit select a frequency channel for an information transfer.

20. The method according to claim 19, wherein the measuring unit and/or the central unit performs a frequency channel assessment and the frequency channel assessment is used for selecting the frequency channel.

21. The method according to claim 15, which further comprises providing a lookup table, in which are stored expected values for the information is conveyed and/or parameters, and the lookup table is used for checking the information and/or the parameters, wherein a certain divergence of the information is conveyed and/or of the parameters from the stored expected values in the lookup table constitutes the first trigger event occurring.

22. The method according to claim 15, which further comprises setting a time interval between the first trigger event occurring and a start of a transfer of the information and/or a shortening of the specific time intervals on a basis of a defined pattern or pseudo-randomly.

23. The method according to claim 15, which further comprises providing a plurality of measuring units and/or central units.

24. A method for operating a supply system having a measuring unit and a central unit, which comprises:
   transferring information about an operation of the supply system via a Short Range Device (SRD) or Industrial, Scientific, Medical (ISM) band communication network by radio between the central unit and the measuring unit;
   transmitting the information repeatedly at specific time intervals by the central unit and/or the measuring unit;
   receiving, via the measuring unit or the central unit, the information and then generating a receipt confirmation, which is transmitted to the central unit or the measuring unit;
   opening a receive window of a certain time length for receiving the receipt confirmation via the central unit or the measuring unit, after transmitting the information;
   decreasing a transfer reliability by decreasing a transmit power for transmitting the information as of a first trigger event occurring, and increasing the transfer reliability by increasing the transmit power again as of a second trigger event occurring; and
   increasing the transfer reliability by increasing the certain time length of the receive window as of the first trigger event occurring, and decreasing the transfer reliability by decreasing the certain time length again as of the second trigger event occurring, the second trigger event occurring being defined as the central unit receiving the receipt confirmation from the measuring unit, and/or as a tripping of a timer and/or as a successful connection to an external transmission system.

\* \* \* \* \*